Oct. 6, 1931.  G. E. WEAVER ET AL  1,825,764
AUTOMOBILE LIFTING APPLIANCE
Filed May 26, 1928    5 Sheets-Sheet 1
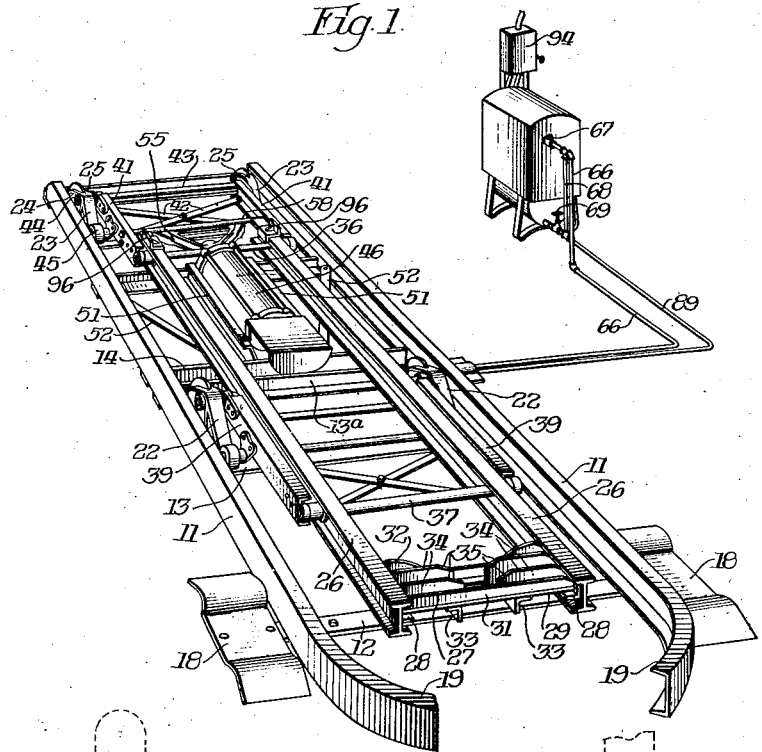
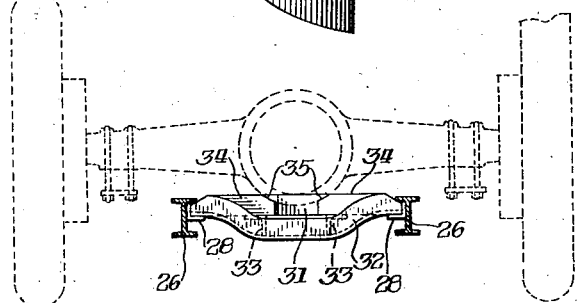
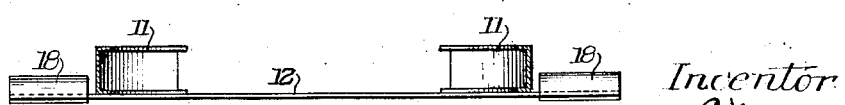
Inventor
Gailard E. Weaver
Albert R. Squyer
By Walter M. Fuller Atty

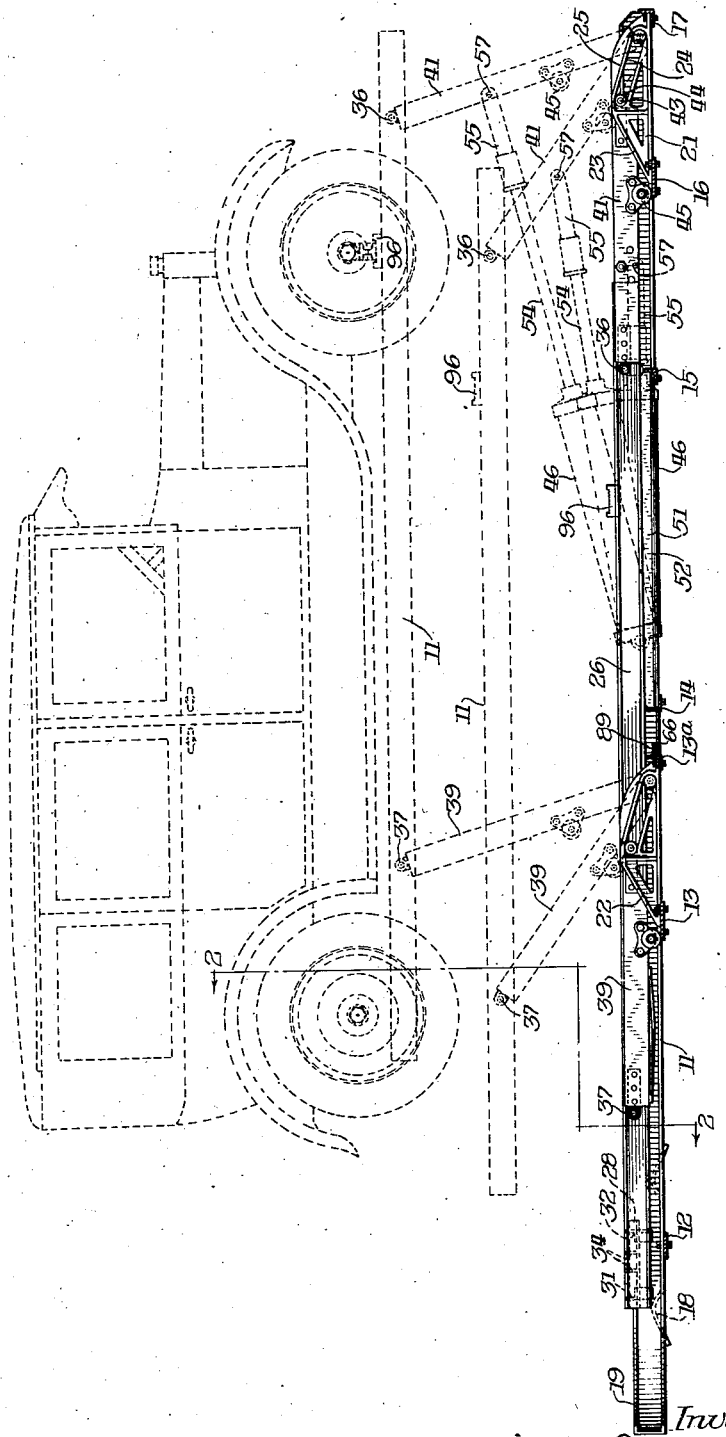

Oct. 6, 1931. G. E. WEAVER ET AL 1,825,764
AUTOMOBILE LIFTING APPLIANCE
Filed May 26, 1928 5 Sheets-Sheet 3

Inventor
Gailard E. Weaver
Albert R. Squyer
By Walter M. Fuller Atty.

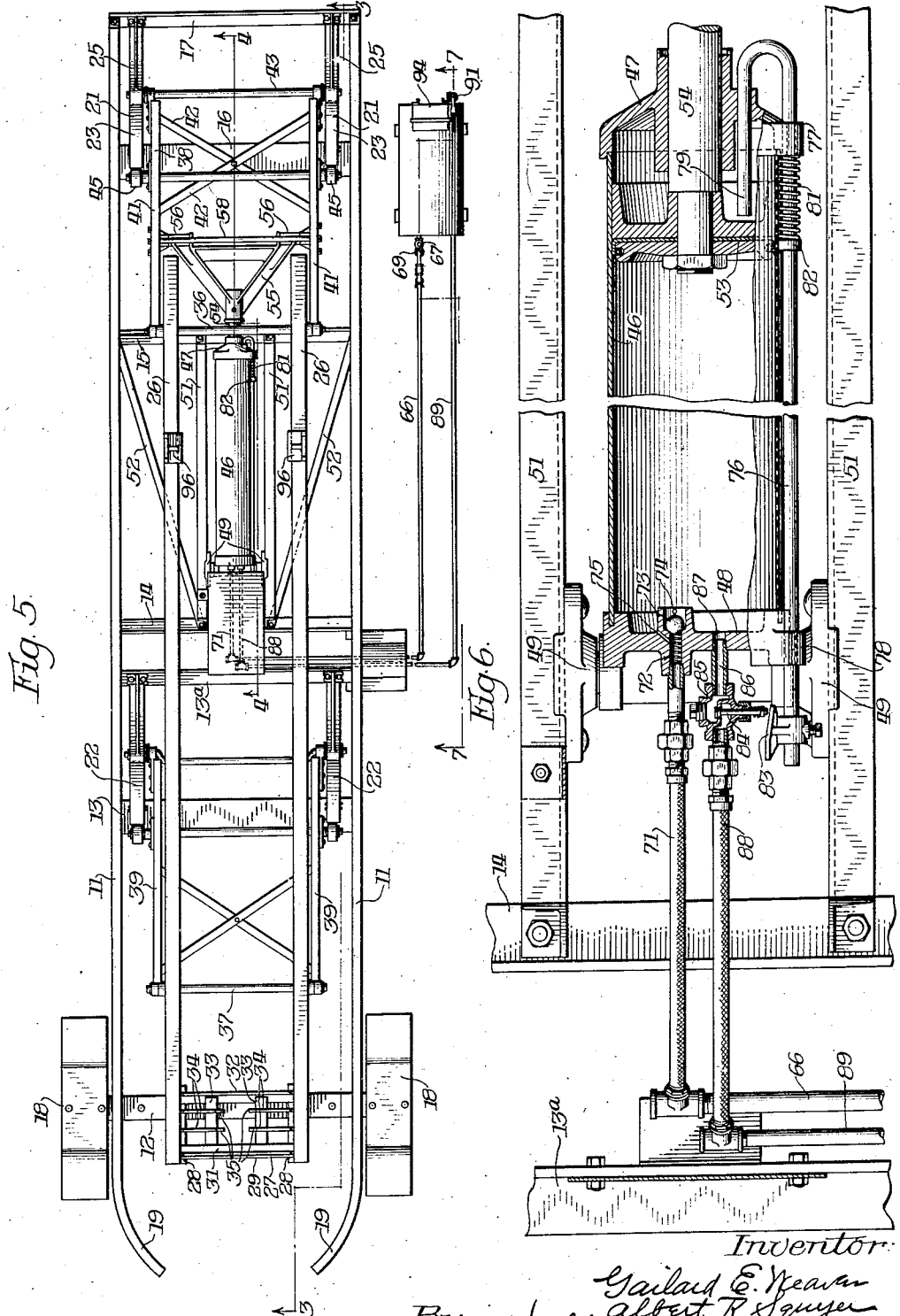

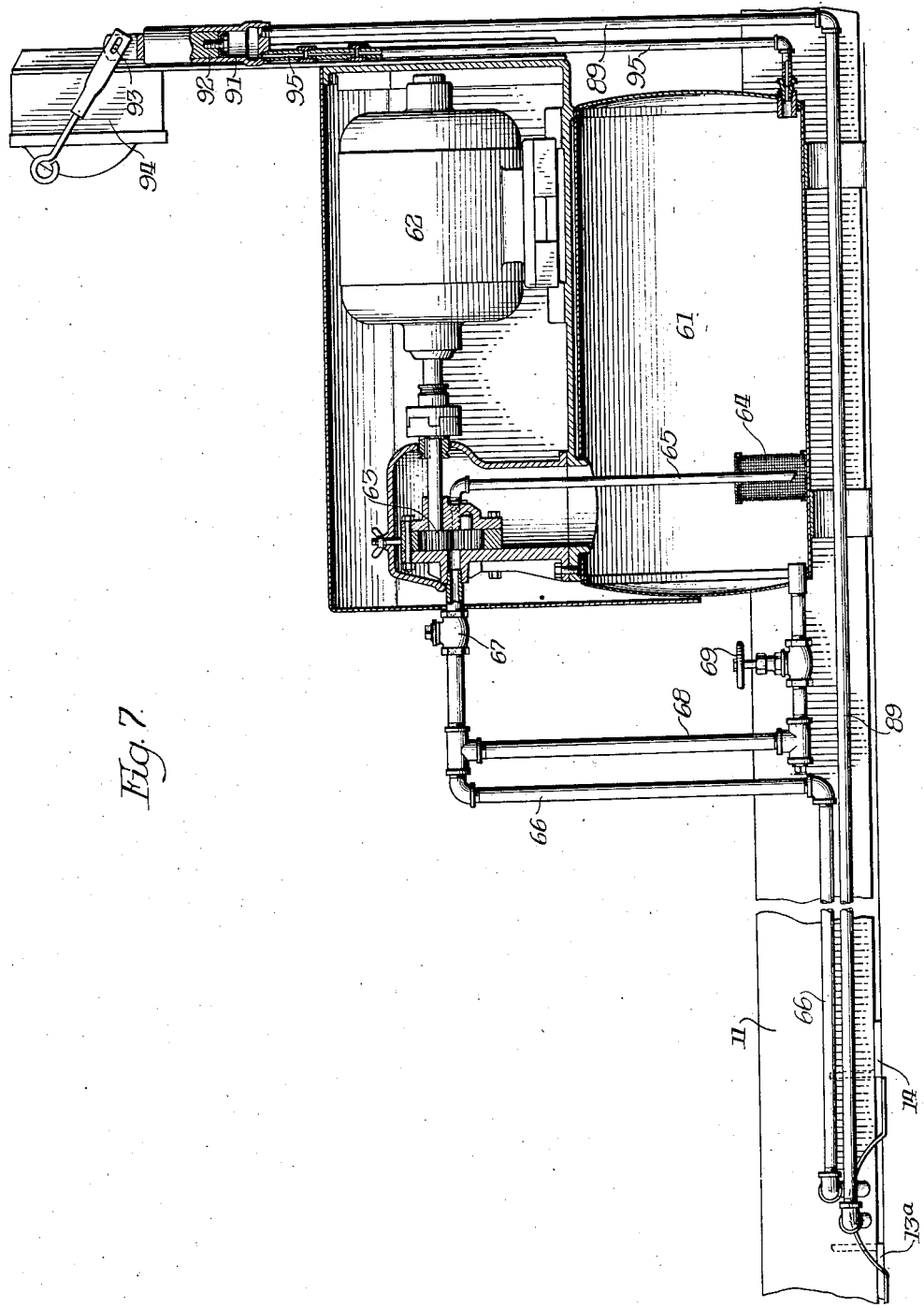

Patented Oct. 6, 1931

1,825,764

UNITED STATES PATENT OFFICE

GAILARD E. WEAVER AND ALBERT R. SQUYER, OF SPRINGFIELD, ILLINOIS, ASSIGNORS TO WEAVER MANUFACTURING COMPANY, OF SPRINGFIELD, ILLINOIS, A CORPORATION OF ILLINOIS

AUTOMOBILE LIFTING APPLIANCE

Application filed May 26, 1928. Serial No. 280,884.

The present invention provides a type of automobile elevating or raising mechanism which possesses certain structural and functional advantages over others which have preceded it and which are designed to facilitate lubrication service, washing and under-chassis repairs.

The new appliance, when lowered or collapsed, occupies but small space of shallow depth, permitting the car to be driven over it with ease and allowing the car, when lowered to the ground or floor after servicing, to be driven forwardly in leaving the apparatus, the latter having no upstanding parts to obstruct or prevent such travel of the automobile.

Another feature of the new device is the possibility of having the power means for supplying the liquid under pressure for operating the lifting mechanism at a distance, thus allowing it, in some instances, to be housed against the weather and with assurance against possible tampering.

Efficient means are also supplied to prevent the elevated car from rocking sidewise even though supported by means of its differential-housing, which can be readily drained if desired.

To the accomplishment of these and other desirable objects, the present, preferred embodiment of the invention has been supplied, the same being illustrated in detail in the accompanying drawings forming a part of this specification and throughout the several views of which like reference characters have been used to designate the same parts. Such illustration, taken with the following description, will give a full understanding of the invention, both from structural and functional standpoints, to those skilled in this art.

In these drawings,—

Fig. 1 is a perspective view of the entire appliance in collapsed or folded condition;

Fig. 2 is a vertical section on line 2—2 of Fig. 3, showing the apparatus in raised condition, and indicating the manner in which a differential housing is accommodated in the grating of the lifting frame provided for that purpose;

Fig. 3 is a vertical section of the appliance in folded condition, on line 3—3 of Fig. 5, and it illustrates in dotted lines two positions of the lifting frame and an automobile supported thereby;

Fig. 5 is a plan view of the appliance;

Fig. 6 is a fragmentary, horizontal section through the operating cylinder, and shows other parts of the mechanism in full lines; and Fig. 7 is an enlarged, vertical section through the oil supply tank, electric motor and oil pump, on line 7—7 of Fig. 5.

Figure 4:
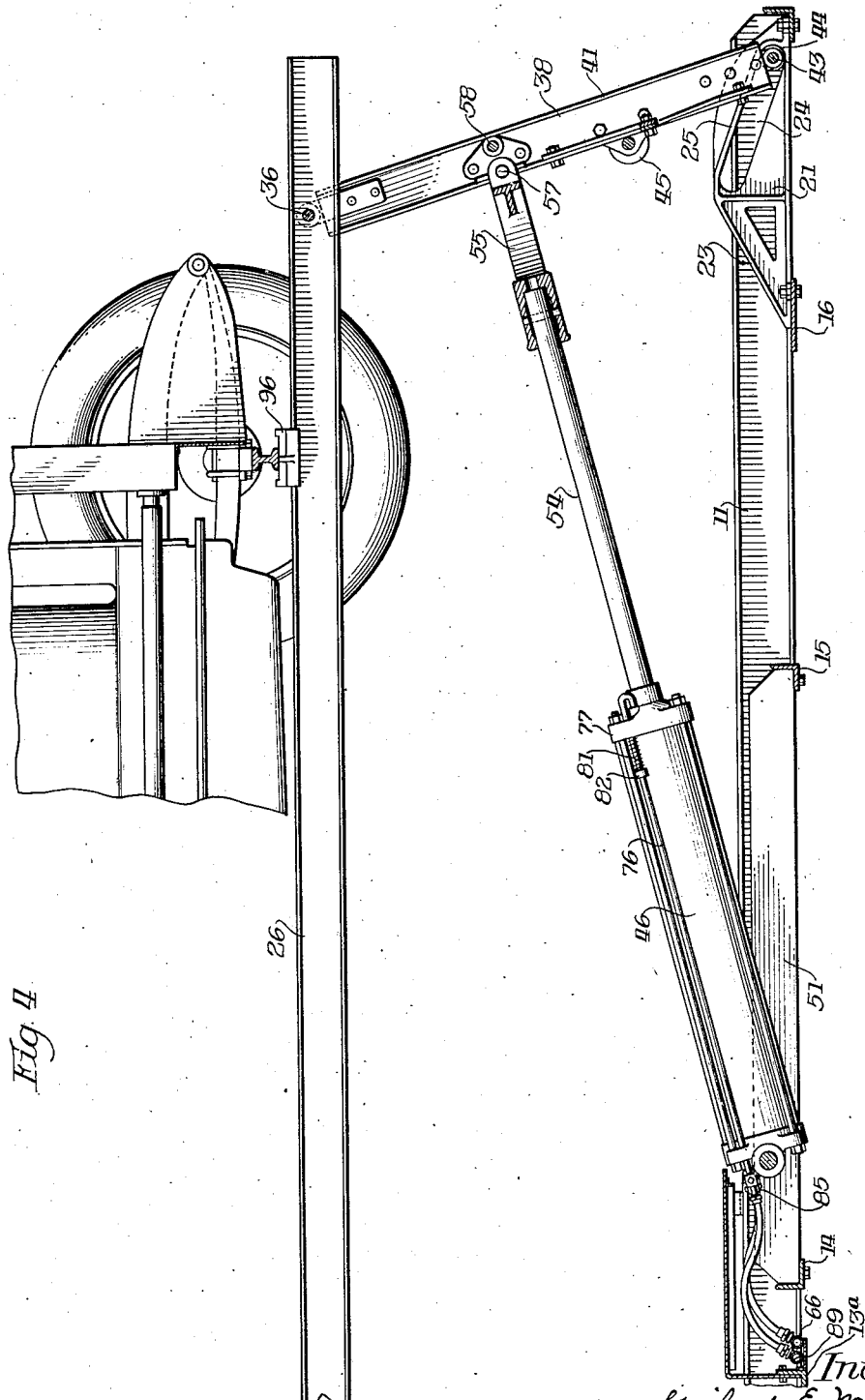
Fig. 4 is a fragmentary, substantially central, vertical, longitudinal section, on an enlarged scale, on line 4—4 of Fig. 5.

Referring to these drawings, it will be noted that the main or base frame, which is designed and intended to rest on the floor or ground without special foundation, comprises a pair of parallel, horizontal channel-bars 11, 11 spaced apart a suitable distance and connected together by a number of cross bars or plates 12, 13, 13ª, 14, 15, 16 and 17, the whole forming a frame of proper strength.

Near one end of such frame, the transverse frame-bar 12 extends beyond the elements 11, 11, and its projecting ends are supplied with seats or saddles 18, whose centers are depressed, adapted to receive the rear wheels of the automobile to be raised and to hold them in correct position initially, so that the lifting frame hereinafter described will properly engage the frame or chassis and differential housing or other parts of the vehicle.

To facilitate the driving of the car astride or astraddle such foundation or main frame, the end portions of the bars 11, 11, adjacent to such wheel seats or locating members, are curved inwardly or toward one another, as is clearly shown in Fig. 1, but the other ends of such bars may be left straight, because there is no substantial difficulty in driving the automobile away from or over the appliance when the work has been completed.

Mounted on the frame cross-members 16 and 17, just inside of the bars 11, 11, are a pair of parallel track or cam elements 21, 21, and like members 22, 22 are mounted in similar relation on the transverse frame-parts 13, 13ª, each such casting, 21 or 22, having a top, inclined cam or track surface 23 and a reversely-sloping cam or track slot 24, the top and one end of which has a border or marginal flange 25 of corresponding shape (see Fig. 4).

The lifting or elevating frame comprises a pair of parallel, spaced I-beams 26, 26 connected together at the entrance end of the apparatus by a differential-grating, characterized as a whole 27, and composed of two angle-bars 28, 28 fastened by one or more bolts or rods 29 against the inner faces of the webs of the beams 26, 26, with their flanges disposed horizontally and facing inwardly toward one another.

Such angle-bars 28, 28 have the terminal portions of a straight, cross angle-bar 31 welded to them at one end of the grating, and another, bent, angle-bar 32, having a depressed central part, is similarly mounted on them at the other end of the grating, short, parallel, longitudinal angle-bars 33, 33 being welded to such members 31 and 32.

Four, parallel, intermediate bars 34, 34 are held in position by being welded to their supporting bars 28 and 33, such bars 34, 34 being arranged in two pairs, in register, as shown, with suitable spaces between their adjacent, inner ends, the top edges of such bars being beveled off adjacent to the space between them at 35, 35.

Obviously, the shapes and arrangements of these several bars provide a central cavity or depression in the grating to receive the lower portion of the differential housing of the car to be elevated, and its truss rod or rods, if any, will be accommodated in the gaps or spaces between the transverse members of the grating.

The lifting-frame side-bars are additionally joined together by two cross shafts 36 and 37 suitably mounted in their webs.

The means for raising and lowering such inner, movable frame comprises a pair of link structures 38 and 39, the one co-operating with the elements 21, 21, and the other coacting with the like members 22, 22, so that a description of one will suffice for both.

Each such link construction embodies a pair of separated, parallel channel-bars 41, 41 forming parts of a swinging or hinged link-frame, of which diagonal brace-bars 42, 42 constitute parts, the upper ends of the members 41, 41 being pivotally or hingedly connected to the lifting-frame on the ends of the corresponding, cross shaft 36.

A shaft or rod 43 joins the lower ends of the bars 41, 41 together, and its protruding ends are fitted with anti-friction rollers or spools 44 located in the slots 24 of the cam-track elements 21, 21.

In addition, each bar 41 carries a roller 45 outside of the same adapted to co-operate with the sloping cam-track 23 of the corresponding, stationary casting 21.

To the extent already described, the two link members 38 and 39 are alike, but the one designated 38 at the front portion of the structure is equipped with a power-operating means which will now be described.

A cylinder 46 has a head 47 at one end and another head 48 at its opposite end hinged in horizontal bearings 49, 49 mounted on the inner side of a pair of lengthwise-disposed bars 51, 51 secured to the cross-bars 14 and 15, which are braced in position by diagonal bars 52, 52, whereby the cylinder may swing up and down in a vertical plane at the middle of the appliance.

Such cylinder has a piston or plunger 53 slidable in it, and the piston-rod 54 thereof extends out through a bearing in a head 47, its outside end being secured, as by pinning, to one apex of a triangular-shaped casting 55, the other two, spaced corners of which have bearings 56, 56 rockingly mounted on a rod or shaft 57 connecting the two, link channel-bars 41, 41 together, an adjacent, additional rod 58 also fastening or uniting such elements 41, 41 together.

When the appliance is collapsed or folded and its lifting frame is in its lowermost position, such frame, its two link structures, and the cylinder and its associated parts are all down substantially flat in the plane of the outer main-frame, so that there is no obstruction or hindrance to driving a car over the whole structure.

Assuming that an automobile has been driven astride the apparatus and that its rear wheels have been received in the seats or saddles 18, 18 which position its differential housing correctly with respect to the grating of the lifting frame, it will be obvious that, when oil or other liquid under substantial pressure is admitted to the cylinder 46 behind the piston, the latter will be forced along the cylinder in the usual way.

Initially, both sets of link structures are moved bodily forwardly by the travel of the piston, their rollers 45 rolling up the inclines 23, and their rollers or spools 44 traveling down the sloping slots 24.

The result is that the link structures rock upwardly somewhat during such first bodily travel, and, as soon as the spools 44 reach and engage the walls at the lower ends of the slots 24, the continued movements of the piston rod and member 55 rock the link devices more rapidly until they reach their uppermost, almost vertical, positions, as indicated in Figs. 3 and 4.

It will be noted that the lifting frame maintains its horizontal relation through the full extent of its ascent and descent, owing to the simultaneous bodily and other movements of the two link structures, the cylinder 46 rocking around its hinge mounting in a well understood manner and as is clearly shown in the drawings.

Inasmuch as the lower portion of the differential-housing, is received in the center cavity of the grating, tilting or rocking of the automobile sidewise in its raised condition is avoided, the grating affording means for the accommodation of the truss rod or rods and permitting draining of the housing with ease and dispatch.

The means employed for controlling the oil or other liquid under pressure includes the following coacting instrumentalities:

A liquid storage or supply tank 61, which may be located at some distance from the automobile-elevating appliance, if desired, has an electric motor 62 and a gear-pump 63 mounted thereon, these elements being housed, preferably, in some convenient enclosure where they will be safe and protected from the weather.

The pump receives its oil from the lower part of the container or receptacle 61 through a screen 64 and a pipe 65, the delivery-pipe 66 of the pump being supplied with a check-valve 67.

Pipe 66 is also connected to the lower portion of the tank by a by-pass pipe 68 having a hand-operated valve 69, and is connected through a flexible hose or connector 71 with a passage 72 through the cylinder-head 48 equipped with an inwardly-opening, spring-pressed ball-valve 73, the opening movement of which is limited by a stop-pin 74, the cylinder-head having a small by-pass passage 75 around the ball-valve and its seat.

Obviously, when the electric motor is actuating the pump, the latter receives its oil from the tank and delivers it, under suitable pressure, through the check-valve 67, pipe 66, flexible connector 71 and passage 72, into the cylinder 46, where it operates to forcibly slide the piston along, causing the hereinbefore-specified elevation of the lifting-frame and the vehicle associated therewith.

Obviously, when the piston reaches the limit of its outward stroke, it is necessary to shut off the action of the motor and pump automatically, and means are provided for accomplishing this result.

A rod 76 arranged lengthwise of the cylinder, outside of the latter, is slidable in suitable bearings 77 and 78, one end of the reciprocatory rod or shaft being bent at 79 and slidable in a bearing through the cylinder-head 47, and projecting inside of the cylinder into the path of travel of, and where it is designed to be struck by, the piston as the latter approaches the end of its outward movement, the rod normally being yieldingly held in the position depicted in Fig. 6, by an encircling coiled spring 81, pressing at one end against the bearing-member 77, and at its other end against a collar 82 fixed on the rod.

The other end of the rod is supplied with a cam 83 which is designed and intended, when the rod is shifted to the right by the piston, to engage and press in the stem 84 of a spring-actuated, self-closing valve 85 in a pipe 86 fitted in an opening 87 through the cylinder-head 48, such valve, by means of a flexible connector or hose 88, being joined to a pipe 89 in communication with the inside of a small, conveniently-supported cylinder 91 below a small piston 92 slidable therein and operatively connected at 93 with an electric-switch 94 controlling the electric circuit of the motor 62.

A small-calibered conduit 95 also connects the lower part of such cylinder 91 with the oil-supply tank 61.

Therefore, when the piston, during its outward, power stroke, engages the end 79, the rod 76 is pushed to the right, causing cam 83 to open valve 85 and to allow a small amount of the oil under pressure in the cylinder 46 to flow through the parts 87, 86, 85, 88 and 89 into the small, upright cylinder 91, effecting the ascent of its piston 92, resulting in opening the electric-switch 94, and, hence terminating the operation of the electric motor and the pump.

The conduit 95 is of such restricted internal caliber that the oil cannot flow through it as rapidly as it enters the cylinder through the larger pipe 89, hence allowing the oil to operate the plunger or piston 92 in the manner stated.

It is necessary to drain the oil from the cylinder 91, so that the electric switch may be again closed when occasion requires, at the same time bringing the plunger 92 to its down position.

Accordingly, after the motor and pump have ceased operating, the small drain or relief pipe 95 permits a slow escape of oil from the main power cylinder 46, through the stated connections, until the piston 53 recedes slightly due to the weight of the load on the lifting-frame, but sufficiently nevertheless to permit the rod 76, responding to the expansion of its spring 81, to move enough to the left to allow cam 83 to permit valve 85 to close, and thereafter such drainage from cylinder 91 continues until its contents have been completely discharged.

When the parts are in this relation, the lifting-frame and its load will be maintained indefinitely in the raised or elevated position.

When it is desired to lower the load and frame, which is accomplished due to their own weight, the operator opens the hand-valve 69, permitting the oil in the cylinder below the piston to return to the tank 61, thus allowing the piston to move to the left, with the resulting descent of the lifting-frame and the automobile which it bears.

The ball-valve 73 is normally held open by its spring, both during the admission of the oil through its port into the cylinder and also during its outward flow therethrough at the customary rate during the lowering of the frame and the vehicle.

If, however, through accident to the piping, or for any other reason, the load tends to descend too rapidly, causing an abnormal oil pressure on the valve, the latter will be pressed to its seat, and the retarded oil discharge through the restricted by-pass 75 will prevent the load from descending at too great speed, thus insuring against its falling or dropping.

If desired, blocks 96, 96 may be mounted lengthwise adjustably on the lifting-frame side-bars 26, 26, so as to engage beneath the front axle of the vehicle, since the position of the differential-housing is definitely fixed and vehicles of different lengths may be accommodated on the appliance.

Obviously, the apparatus elevates the car by engagement therewith beneath its front axle and its rear-axle housing, leaving the wheels free to turn for removing tires, adjusting the brakes, bearings, etc., the space inside of the frame structure being unobstructed, thus rendering the under side of the car readily accessible for the convenient making of needed repairs.

Stated somewhat differently, the points of lifting contact with the automobile are not on the tires, as is ordinarily the case with devices of this general character, but the lift is effected directly against the lower part of the differential-housing of the rear axle and at two points transversely spaced apart on the front axle, thus providing ample stability for the car when it is in its hoisted relation and affording a more accessible way to the under side of the car.

After the automobile has been lowered to the ground, it is not necessary to back it away from the elevating device, but the operator may drive it forwardly because there are no upstanding parts to preclude such desirable operation.

We claim:

1. In an automobile elevating and lowering appliance, the combination of a base-frame, a lifting-frame adapted to support an automobile, link-means spaced apart lengthwise said frames and each having a hinge connection with said lifting frame and a fulcrum connection with said base-frame movable downwardly and lengthwise the latter during at least a portion of the lifting-frame elevating operation, inclined track-means disposed lengthwise of said base-frame, and means on each of said link-means cooperating with the corresponding track-means to rock said link-means upwardly during the movements of said fulcrum connections longitudinally of said base-frame, and power-means to operate said link-means and lifting-frame.

2. In an automobile elevating and lowering appliance, the combination of a base-frame, a lifting-frame adapted to support an automobile, link-means spaced apart lengthwise said frames and having hinge connections with said lifting frame, track-means for each of such link-means having reversely sloping trackways disposed lengthwise said base-frame, each of said link-means having fulcrum-means cooperating with and movable on the trackway sloping in one direction and other means adapted to travel on the reversely-inclined trackway, and power-means to operate said link-means and lifting-frame.

3. In an automobile elevating and lowering appliance, the combination of a base-frame adapted to rest on the ground or floor, a lifting-frame adapted to support an automobile, link-means spaced apart lengthwise of and having hinge connections with said frames, a power-cylinder hinged to said base-frame, a piston reciprocatory in said cylinder, a piston-rod connected to one of said link-means, and means to control the admission and discharge of a fluid into and from said cylinder, said lifting-frame, link-means, and cylinder in the collapsed condition of the appliance being sufficiently low and said control means being so positioned as to permit an automobile astride the appliance to be driven over them.

4. In an automobile elevating and lowering appliance, the combination of a base-frame, a lifting-frame adapted to support an automobile, link-means spaced apart lengthwise said frames and each having a hinged connection with said lifting frame and a fulcrum connection with said base-frame movable lengthwise of the latter, a power-cylinder hinged to said base-frame, a piston reciprocatory in said cylinder, a piston-rod connected to one of said link-means, and means to control the admission and discharge of a fluid into and from said cylinder, said lifting-frame, link-means, and cylinder in the collapsed condition of the appliance being sufficiently low and said control means being so positioned as to permit an automobile astride the appliance to be driven over them.

In witness whereof we have hereunto set our hands.

GAILARD E. WEAVER.
ALBERT R. SQUYER.